Nov. 19, 1968   W. B. PESTER ET AL   3,411,845

AUTOMATIC SLIDE PROJECTOR

Filed Nov. 28, 1966   12 Sheets-Sheet 1

INVENTORS
WILLIAM BRUCE PESTER
ALBERT J. SCHWARZ
BY CHARLES F. SEITZ
Nathan N. Kraus
Frank H. Marks
ATTORNEYS Nov. 19, 1968   W. B. PESTER ET AL   3,411,845
AUTOMATIC SLIDE PROJECTOR
Filed Nov. 28, 1966   12 Sheets-Sheet 2

INVENTORS
WILLIAM BRUCE PESTER
ALBERT J. SCHWARZ
BY CHARLES F. SEITZ
Nathan N. Kraus
Frank H. Marks
ATTORNEYS INVENTORS
WILLIAM BRUCE PESTER
ALBERT J. SCHWARZ
CHARLES F. SEITZ
BY Nathan N. Krow
Frank H. Marks
ATTORNEYS Nov. 19, 1968   W. B. PESTER ET AL   3,411,845
AUTOMATIC SLIDE PROJECTOR
Filed Nov. 28, 1966   12 Sheets-Sheet 5

INVENTORS
WILLIAM BRUCE PESTER
ALBERT J. SCHWARZ
BY CHARLES F. SEITZ
Nathan N. Kraus
Frank H. Marks
ATTORNEYS Nov. 19, 1968  W. B. PESTER ET AL  3,411,845
AUTOMATIC SLIDE PROJECTOR
Filed Nov. 28, 1966  12 Sheets-Sheet 6

INVENTORS
WILLIAM BRUCE PESTER
ALBERT J. SCHWARZ
BY CHARLES F. SEITZ
Nathan N. Kraus
Frank H. Marks
ATTORNEYS Nov. 19, 1968   W. B. PESTER ET AL   3,411,845
AUTOMATIC SLIDE PROJECTOR
Filed Nov. 28, 1966   12 Sheets-Sheet 8

INVENTORS
WILLIAM BRUCE PESTER
ALBERT J. SCHWARZ
BY CHARLES F. SEITZ
  Nathan N. Kraus
  Frank H. Marks
     ATTORNEY

United States Patent Office 3,411,845
Patented Nov. 19, 1968

3,411,845
AUTOMATIC SLIDE PROJECTOR
William Bruce Pester, Ann Arbor, Mich., and Albert J. Schwarz, Lincolnwood, and Charles F. Seitz, Oak Park, Ill., assignors to Sears, Roebuck and Co., Chicago, Ill., a corporation of New York
Filed Nov. 28, 1966, Ser. No. 603,078
14 Claims. (Cl. 353—88)

ABSTRACT OF THE DISCLOSURE

A jam-proof slide projector of the type arranged to support a slide tray having a portion adapted to be fixed on the projector and a relatively movable portion, the fixed portion having a slot through which the slides are adapted to pass vertically, one at a time, and to be received in slide guides arranged in vertical registration with the slot, one of which guides is movable, and having indexing means in the projector moving the movable tray portion to successively align the slides in the tray in vertical registration with the slot, and also having slide carrying means operating in timed relation with the indexing means to feed each slide between the guides into projection position and to return each slide through the slot into the tray, a shutter being operatively coordinated with the movable slide guide so that the shutter is prevented from opening during movement of a slide into and out of projection position and also in the event that a slide is absent from between the guides. The drive means for the projector is operable for a full or partial cycle and the tray may be mounted on and latched to the projector in any position. When the drive means has been operated to complete a partial cycle the tray is released for movement relative to the projector or for removal therefrom.

---

Our invention relates generally to an automatic slide projector and more particularly to a projector of the type used in conjunction with a tray in which slides are stored and are sequentially moved from the tray into projection position and then returned to a tray for storage.

Our invention is directed to a projector of the type exemplified in Robinson Patent No. 3,276,314.

In accordance with our invention we provide a projector in which the slide tray may be mounted in any position and latched against removal without the necessity for aligning the tray with reference to a particular zero point. Correspondingly, the projector permits removal of the tray in any position upon release of the latching means.

Indexing means move the tray to successively bring the slides into registry with cooperating slide guides. The slides are moved from the tray by a slide lifter which carries each slide between a pair of cooperating slide guides, one of which is movable, to afford free movement of the slide to projection position, at which point the movable guide effects a clamping action on the slide to secure the same for projection. A shutter mechanism is coordinated with the movable slide guide so that the shutter remains closed during the movement of a slide into and out of projection position and in the event the projector is operated with no slide disposed between the guides. A key which is adapted to lock the tray against movement is moved to non-locking position when the latch is released so that the tray may be moved to any desired position.

Other objects and advantages of our invention will become apparent to those skilled in the art as the description proceeds.

Figure 1:
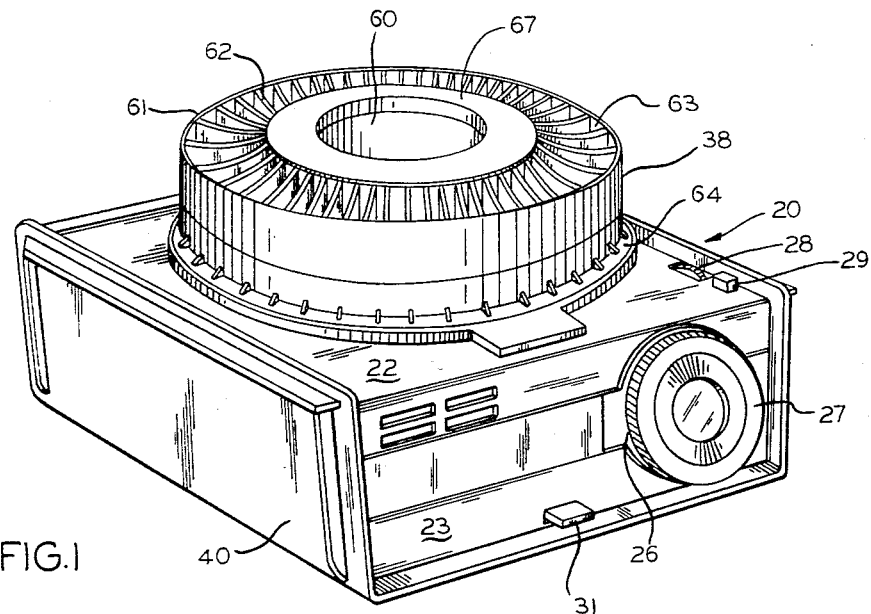
FIG. 1 is a front perspective view of an automatic slide projector in accordance with our invention.
Figure 2:
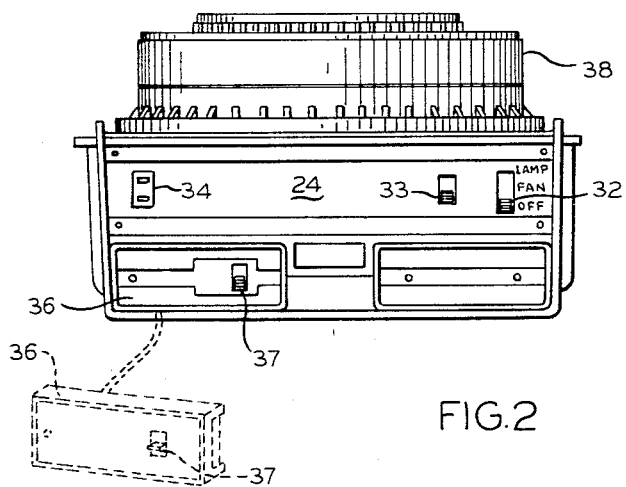
FIG. 2 is a rear elevational view of the projector illustrated in FIG. 1.

Referring to the drawings, the numeral 20 indicates, generally, a slide projector having a cast metal frame 21 including a top wall 22 and integral front and rear walls 23 and 24, respectively. The front wall 23 includes an aperture 26 through which a lens barrel 27 extends. A manual focus wheel 28 projects through a slot in the top wall 22 and is operatively connected with the lens barrel 27 for advancing or retracting the same. A depressible button 29 when actuated permits removal of the lens barrel from the projector frame. A depressible lever 31 is operable to effect release of the locking mechanism for the tilt leg, not shown, whereby adjustment of the elevation of the front end of the projector may be effected.

The rear wall 24 of the frame includes apertures through which project on-off switch button 32, button 33 controlling the tray lock means, hereinafter to be described, and a room light plug receptacle 34. The rear wall 24 also includes an opening for removably receiving a housing 36 through which projects a control switch button 37 which controls the forward or reverse movement of the slide tray 38. The switch button 37 is connected by an electrical cord to electrical components controlling the operation of the projector and, accordingly, affords remote control of the indexing movement of the slide tray 38.

A channel shaped frame member 40, including a bottom and side walls, cooperates with the frame member 21 to completely house the operating mechanism of the projector.

The top wall 22 of the frame is provided with an upwardly extending central spindle 39 which is bevelled at the top and is slotted as at 41 to accommodate a retractable tray latch 42. The top wall 22 additionally is provided with a circular lip 43 bearing an index mark 44.

A plurality of upwardly extending tray locating pins 46 are arranged in relatively close proximity to the spindle 39 and an additional locating pin 47 is more remotely positioned from the spindle 39. A pair of nylon inserts 48 extend above the surface of the top wall 22 and afford bearing surfaces for the slide tray 38 which is adapted to rest thereon. The top wall 22 is provided with an opening 49 through which project a tray key 51 and an indexing pawl 52, hereinafter to be described. Adjacent the opening 49 a portion of the top wall 22 is bowed upwardly from opposite sides, as at 53, to afford clearance for movement of the pawl 52 thereunder and to lift the slides to clear the pawl. The top wall 22 is further provided with an opening 54 which is in registration with the slide guides 56 and 57. Arranged on opposite sides of the opening 54 and overlapping the side marginal edges thereof are nylon inserts 58 and 59. The insert 58 includes an integral portion 61 which affords a bearing surface for the tray 38, similarly as the inserts 48. As will be seen in FIG. 3, the inserts 58 and 59 are arranged in spaced relation with the intervening space being in registration with the slide guides 56 and 57. Further, each of the inserts 58 and 59 has a top surface which is inclined upwardly from the outer end so as to effect a slight elevation of each slide as the same is moved into registration with the guides 56 and 57, as will be hereinafter explained.

The type of slide tray or magazine which is intended to be used with the projector of our invention is similar to the type shown in Patent No. 3,276,156, issued Oct. 4, 1966, or that shown in our co-pending application Ser. No. 597,367 filed Nov. 28, 1966, now Patent No. 3,386,195, granted June 4, 1968. For purposes of this description, suffice it to say that the tray 38 comprises a molded cylindrical body including inner and outer annular walls 60 and 61, respectively, joined together by radial spacers 62 forming a plurality of spaced compartments 63. The outer wall has a peripheral rim 64 from which depend a series of circumferentially spaced indexing pins 66, with each pin being disposed in registration with a respective compartment 63. The molded body is mounted on a base for relative movement, the base including a central aperture to receive the spindle 39 and having a series of apertures to receive the locating pins 46 and 47. The base of the tray is thereby maintained stationary, while the body is arranged for rotational movement, as will be hereinafter explained. In order to position the tray on the projector, the latch 42 is caused to be retracted and, after the tray is in position, the latch is caused to be projected in overhanging relation to the marginal edge of the aperture in the base of the tray so as to lock the tray to the projector against inadvertent removal while permitting rotational movement of the body of the tray.

Each of the compartments 63 is intended to receive a slide, the slides being supported on the base of the tray and being retained in their respective compartments by a removable slide cover ring 67. The tray body is adapted to be cyclically indexed to effect registration of each of the compartments 63 with the slide guides 56 and 57 wherein each slide is lowered under the influence of gravity by a slide lifter into projection position in registration with the optical system of the projector.

*Optical system*

Figure 7:
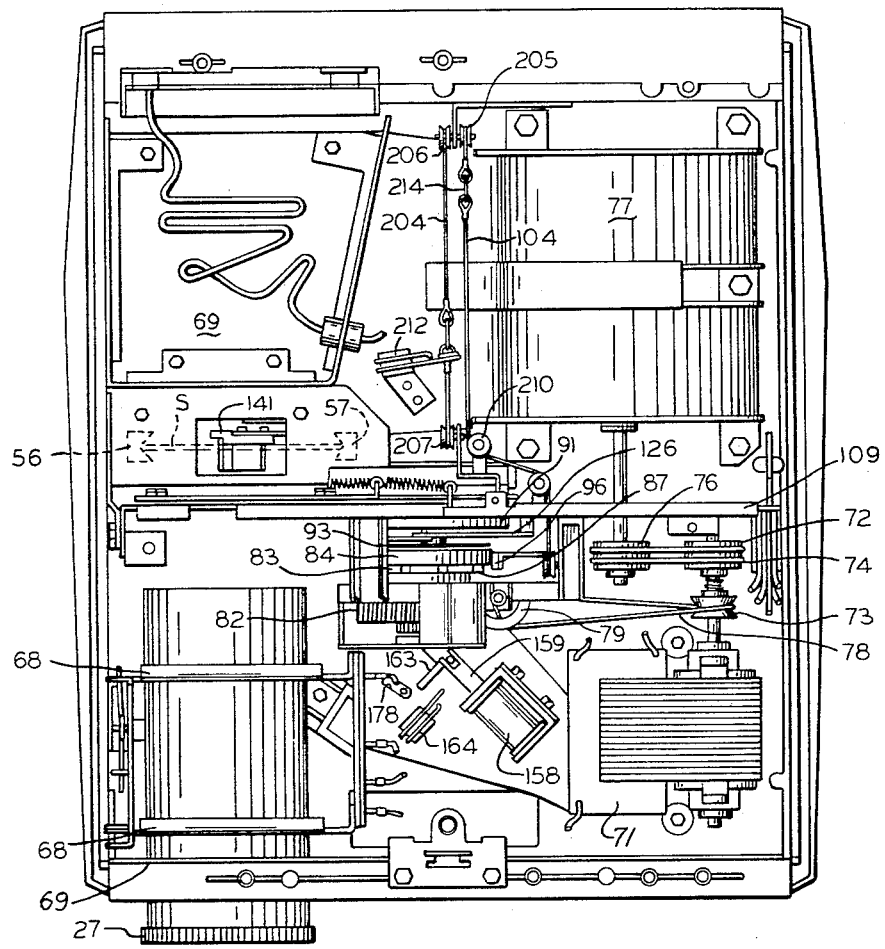
FIG. 7 is a bottom plan view of the slide projector of FIG. 1, with the bottom plate removed.

Referring to FIG. 7, the optical system includes the lens barrel 27 suitably mounted in frame members 68 for reciprocable axial movement under the control of the focusing wheel 28 which frictionally engages the outer surface of the barrel 27. Conventional projector elements, not shown are located along the optical axis and include a projection lamp, condensed lenses and a heat absorption glass, all of such elements being concealed by the panel 69 (FIG. 7).

*Drive mechanism*

Figure 12:
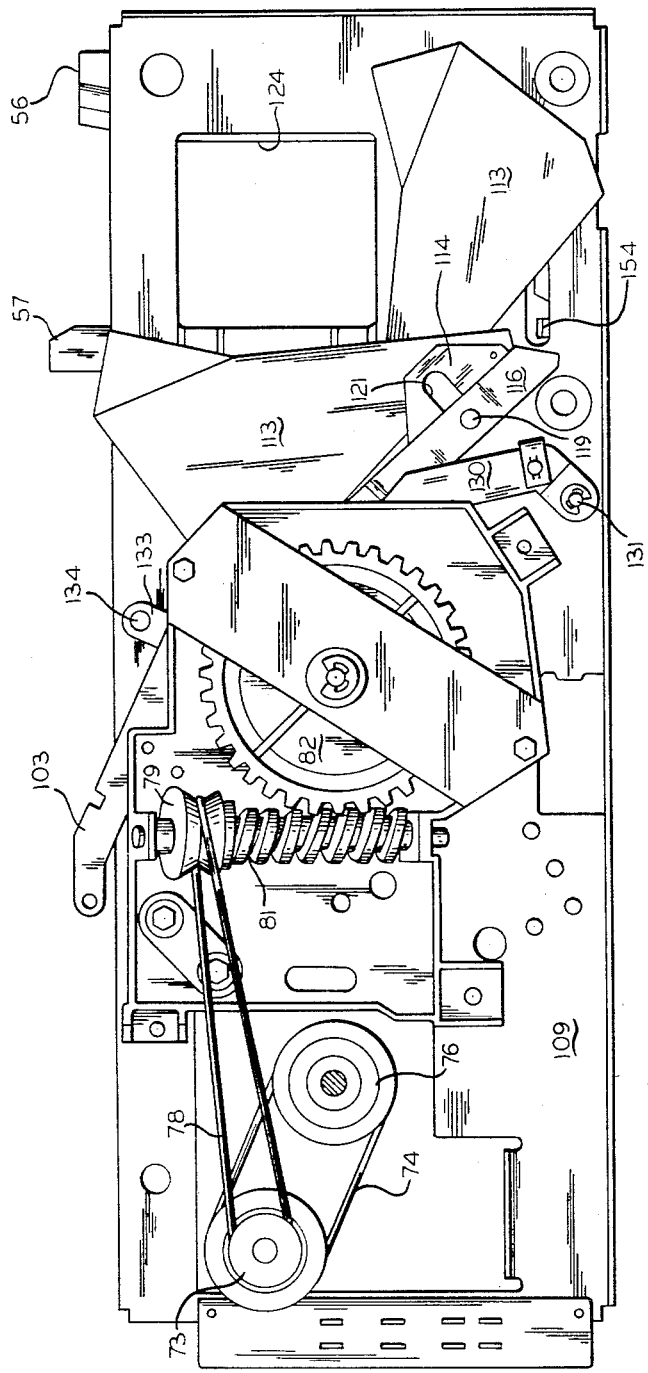
FIG. 12 is a side elevational view of the drive assembly and showing the shutter blades in open position.
Figure 15:
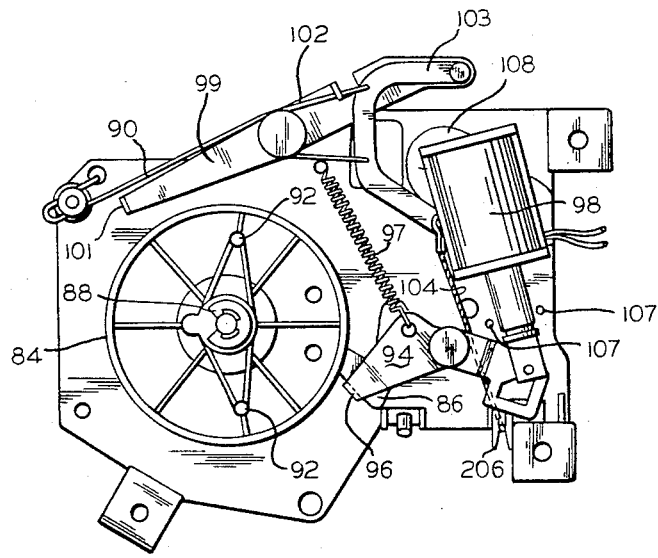
FIG. 15 is a side elevational view of the drive assembly.
Figure 16:
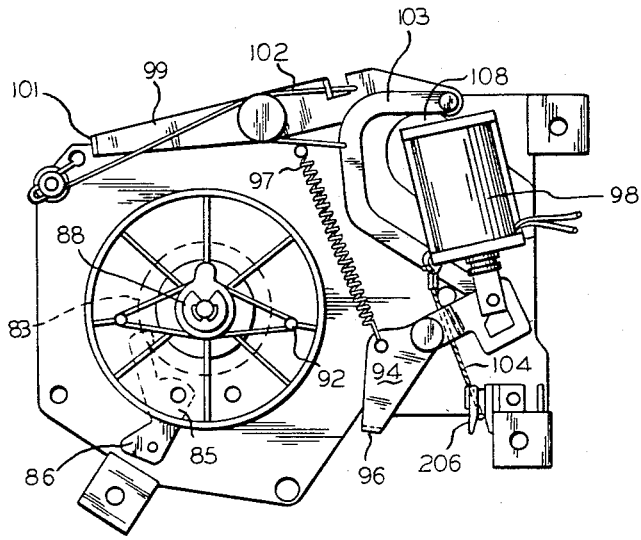
FIG. 16 is a view similar to FIG. 15 showing the solenoid in operated position and the parts in a different operating relationship.

Referring to FIG. 7, the power source comprises an electric motor 71 mounted on the frame. Fixed on the shaft of the motor are pulleys 72 and 73, pulley 72 having a double V-groove and cooperating with a pair of O-ring belts 74 which drive a corresponding pulley 76 mounted on the shaft of a fan 77. The pulley 73 has a single V-groove and cooperates with an O-ring belt 78 which drives a corresponding pulley 79 integral with a worm 81. (FIG. 12.) The worm 81 is mounted in suitable bearings and cooperates with a worm gear 82 to drive the same. The worm gear includes an integral hub portion 83, the end of which is reduced in diameter and is provided on its periphery with a plurality of uniformly circumferentially spaced recesses. Said hub portion constitutes the driving member of a clutch. Mounted on the same shaft as the worm gear for relative rotation thereto is a disc member 84 on which is pivotally supported a pawl 85 adapted to engage in one of the recesses, (FIGS. 15 and 16). The pawl is spring-biased and includes an integral extension 86 which projects beyond the periphery of the disc 84. The disc member 84 carries a lateral projection 87 which serves to limit the outward pivotal movement of the pawl. It will be apparent that when the pawl is engaged in a recess both the disc member 84 and worm gear 82 are locked together for simultaneous rotation. When the pawl is caused to be withdrawn from a recess, as will be hereinafter explained, no rotational motion is transmitted from the worm gear to the disc member which constitutes the driving member of a clutch.

The disc member includes an integral hub 88 provided with a key, both the hub and key being received in a corresponding socket and key way 89 provided in the hub of a compound cam 91, hereinafter to be described. The disc member 84 is additionally provided with a pair of laterally extending integral pins 92 which project through registering apertures in a disc 93 which is disposed coaxially with the disc member 84. The disc 93 is thereby locked to the disc member 84 for rotation therewith. A torsion spring 90 (FIG. 19), has its free end bearing against the hub 88 for the purpose of boosting the action of the pawl to effect complete disengagement from the recesses.

A lever 94 is pivotally supported on a frame portion and has a terminal lug 96 which is disposed in the path of movement of the pawl extension 86 being so biased by a spring 97. The opposite end of the lever is connected to the plunger of a solenoid 98, the plunger being normally disposed in extended position so that the lug 96 is normally disposed in the path of travel of the extension 86 thereby to engage said extension and withdraw the pawl from a recess to de-activate the clutch and cut off transmission of the power to the cam 91. When the solenoid 98 is energized the lever 94 is moved to the inoperative position illustrated in FIG. 16, permitting the pawl to engage in a recess to activate the clutch and effect transmission of power to the cam 91. Of course, the energization of the solenoid 98 is momentary so that the lever 94 immediately resumes its normal position to engage the pawl extension 86 after one revolution of the disc has been effected.

A second lever 99 is suitably pivotally supported and, similarly as in the first instance, has a terminal lug 101 disposed in the path of travel of the pawl extension 86. The lever 99 is spring-biased by a torsion spring 102 in a direction for the lug 101 to engage the pawl extension 86. The opposite end of the lever 99 is connected to a generally C-shaped link 103 to the free end of which is connected a cord 104. The link terminates in a straight portion 106, as seen clearly in FIG. 19, and this portion is disposed between two guide pins 107 provided on the frame of the assembly. As viewed in FIG. 15, the lever 99 is limited in its counter-clockwise movement by the engagement of the link 103 against an edge of the boss 108 on which the solenoid 98 is mounted. Movement of lever 99 in a clockwise direction is limited by the engagement of the end of the lever against an opposite portion of the boss 108.

It will be noted that the lugs 96 and 101 are disposed substantially 180° apart and, accordingly, when the levers 94 and 99 are actuated, as will be hereinafter explained, the driven clutch disc member 84 may make one complete or substantially one-half revolution before being arrested. In other words, the driven clutch member may operate for a full cycle or substantially one-half cycle, depending upon the relationships of the lugs 96 and 101 to the pawl extension 86. As seen in FIG. 15, the lug 96 is in engagement with the extension 86 and has effected de-activation of the driven clutch member 84. When the solenoid 98 is energized to draw in the plunger, the lug 96 is caused to be disengaged from the extension 86 thereby activating the clutch member 84 to rotate the cam 91 in a clockwise direction, as viewed in FIG. 13. When the clutch member 84 has completed one revolution the lug 96 again engages the extension 86 and de-activates the driven clutch member 84. It will be understood that in such operation the lug 101 is disposed in the position illustrated in FIG. 16 where it is out of the path of movement of the extension 86 so that one complete revolution of the clutch member 84 may be made. When the lever 99 is released by reason of the manipulation of button 33, as will be hereinafter explained, the solenoid 98 is caused to be energized in order to withdraw the lug 96 from engagement with the extension 86 to permit the clutch member 84 to rotate. However, the lug 101 is now disposed in the path of movement of extension 86 and the clutch member 84 is caused to be arrested in its rotation at the point where the extension 86 engages the lug 101. This corresponds to substantially a one-half revolution or cycle.

Referring to FIGS. 7, 12, 13 and 14, a frame member 109 extends substantially across the width of the main frame 21 and rotatably supports the cam 91. The cam includes a caming surface 111 on its lateral face and also includes a peripheral cam 112 on the opposite face.

Figure 13:
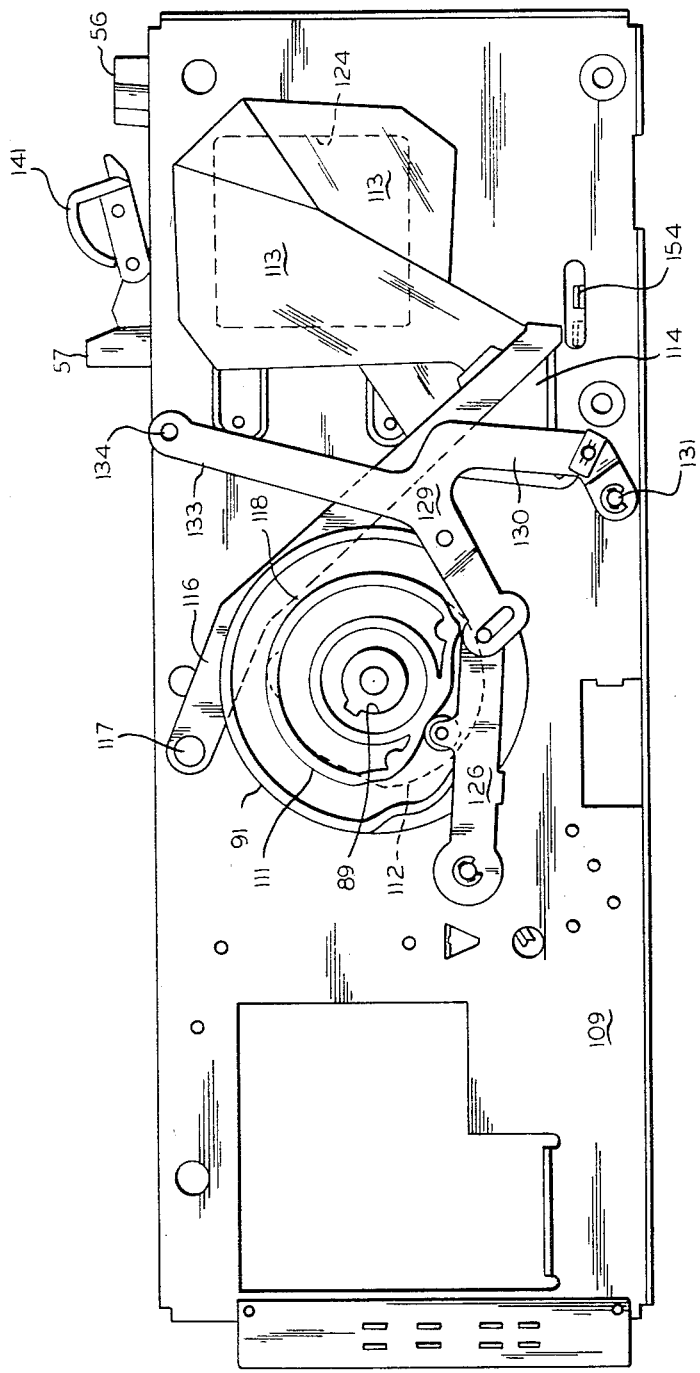
FIG. 13 is a view similar to FIG. 12, with certain parts omitted for clarity, and showing the slide lifter in elevated position and the shutter blades in closed position.
Figure 14:
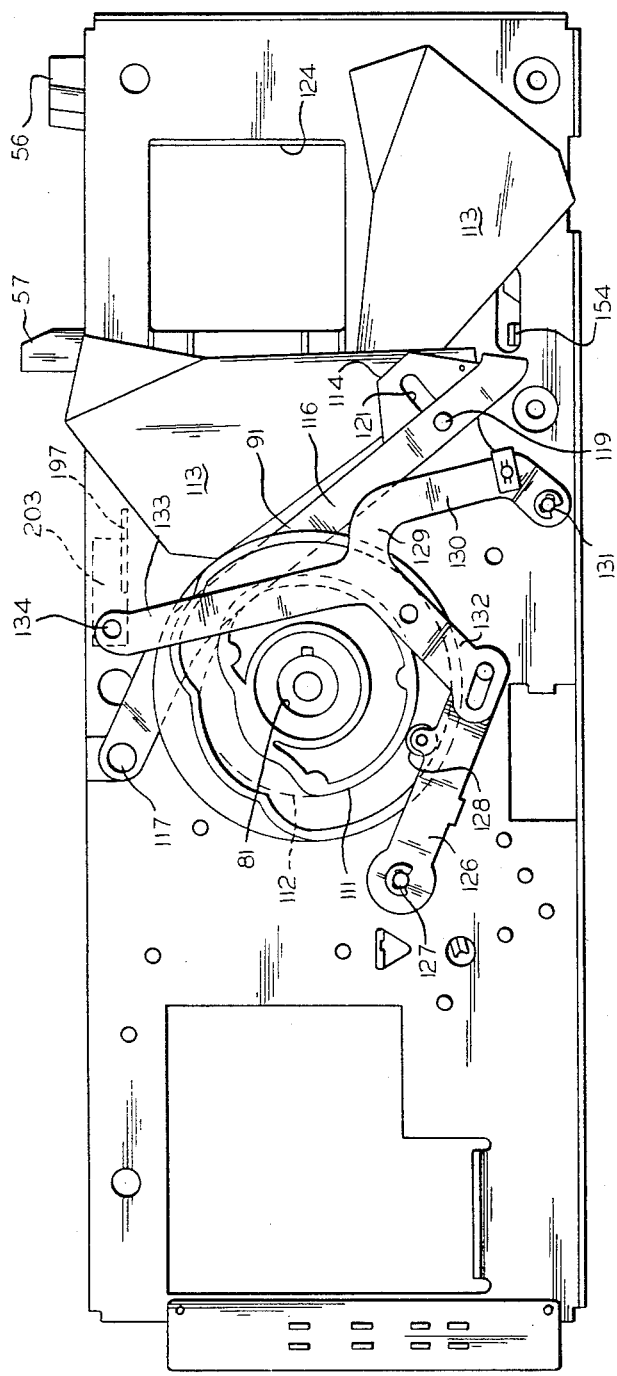
FIG. 14 is a view similar to FIG. 13 showing the parts in the relationship illustrated in FIG. 12.

A pair of cooperating shutter blades 113, shaped substantially as illustrated in FIGS. 13 and 14, are pivotally supported on a bracket 114 mounted on the frame member 109 and are arranged one in overlapping relation to the other. A lever 116 pivoted as at 117 on the frame member 109 is provided with a projection 118 which serves as a cam follower. A pin 119 secured to the free end of the lever 116 extends through registering elongated slots 121 and 122 in the bracket 114 and in the frame member 109 respectively and also through the registering apertures in the shutter blades 113. On the opposite side of the frame member 109 a spring 123 is anchored to the pin 119 and to a lug on the frame member for normally biasing the shutter blades to open position, as illustrated in FIG. 14. It will be seen that as the cam 112 is rotated, the lever 116 will be caused to rock moving the pin 119 within the limit of the slots 121 and 122 thereby to effect opening and closing of the shutter blades, the closed position being illustrated in FIG. 13 and the open position being illustrated in FIG. 14. The cam 112 is so designed that in a single cycle of operation corresponding to a single revolution of the cam 112, the shutter blades are maintained in closed position to prevent the passage of light through the gate 124 during the interval in which a slide is moving into or out of projection position. Accordingly, the movement of the slide is not apparent to a viewer of the projected picture.

Referring to FIGS. 13 and 14, a lever 126 is pivoted to the frame as at 127, the lever being provided with a follower 128 which cooperates with the cam 111. A three-armed lever 129 is pivotally connected by one arm 130 to the frame as at 131 with a second arm 132 having an elongated slot at its terminal portion and being connected thereat to the lever 126. The third arm 133 carries a pin 134 which is pivotally connected to a link 197 of the indexing mechanism, hereinafter to be described.

Figure 17:
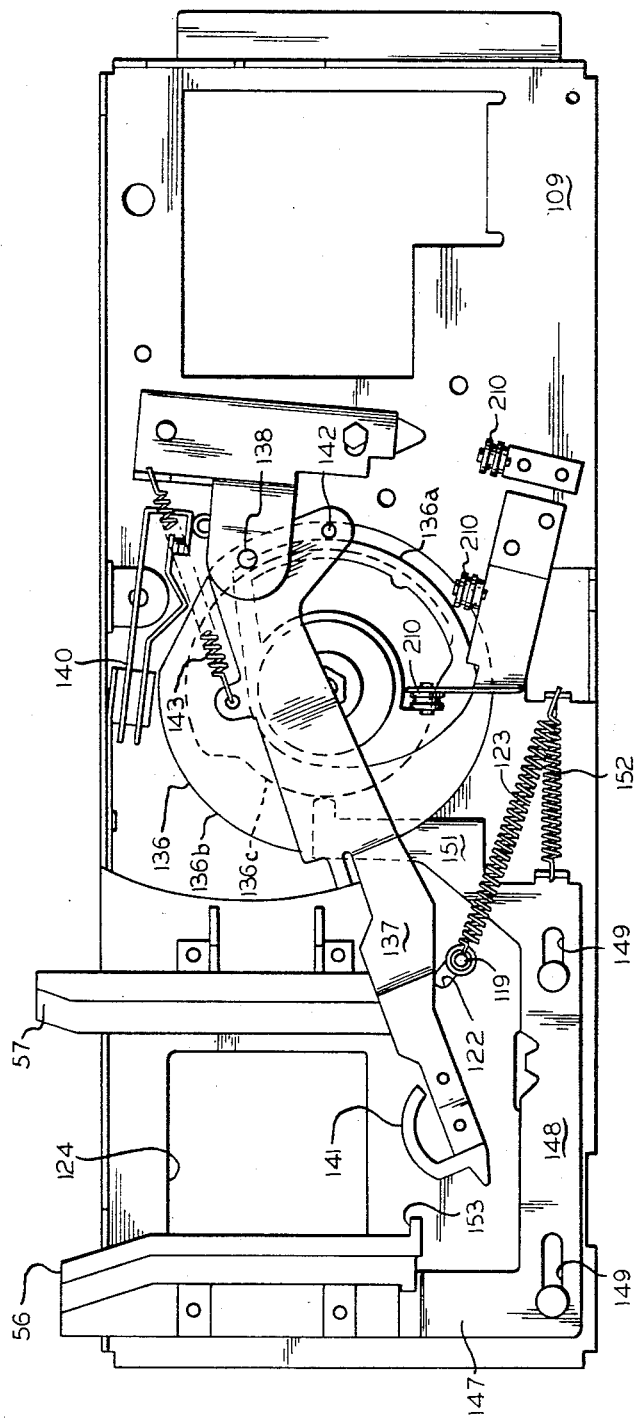
FIG. 17 is an elevational view of the opposite side of the assembly illustrated in FIG. 14.
Figure 18:
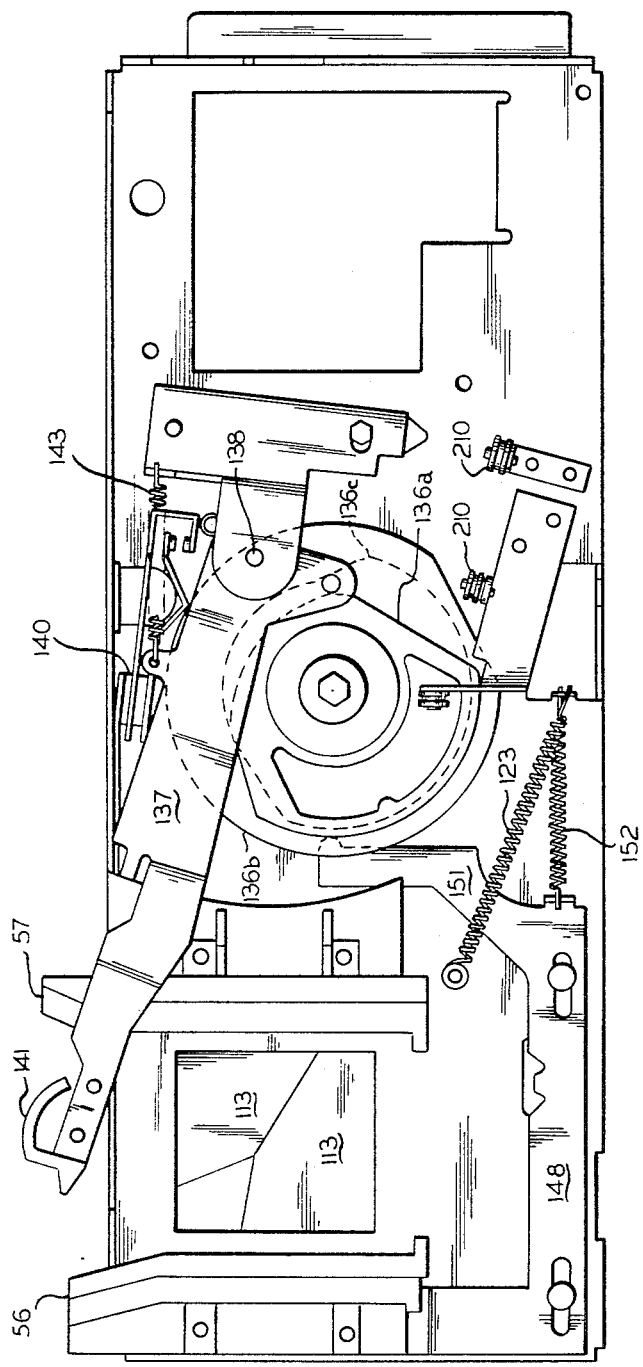
FIG. 18 is an elevational view of the opposite side of the assembly illustrated in FIG. 13.

Referring to FIGS. 17 and 18, a compound cam 136 is mounted coaxially with and keyed to the cam 91 on the opposite side of frame member 109 for simultaneous rotation. The cam 136 includes three camming portions, each arranged to control the operation of a respective component. The slide lifter mechanism includes a double armed lever 137 pivoted as at 138 to a bracket 139 mounted on the frame member. The longer arm of the lever 137 is provided at its distal end with a plastic element 141 having an arcuate surface, with the edges on both sides thereof being bevelled. A pin 142 constituting a cam follower is fixed to the short arm of the lever 137 and is biased into an engagement with the cam portion 136a by a spring 143. The cam portion 136a is adapted to actuate the lever 137 so that in one complete cycle it will move from the lower position illustrated in FIG. 17 to the higher position illustrated in FIG. 18 and then back again to the lower position. In the event a faulty slide or any other malfunction prevents the upward movement of lever 137, its yieldable connection through spring 143 permits the lever to yield despite the continued motion of cam portion 136a, so that upon possible jamming of a slide between guides 56 and 57, it cannot be damaged. The intermediate cam 136b is adapted to actuate switch 140 mounted on the frame member and this serves to de-energize solenoid 98 to prevent overheating in the event that the operator inadvertently holds the switch 37 depressed for too long an interval.

A fixed slide guide 57 is mounted on the frame member 109 and is spaced laterally from the frame member and substantially in registration with the right hand edge of the gate 124, as viewed in FIGS. 17 and 18. A movable slide guide 56 is mounted on a vertical leg 147 of a generally U-shaped bracket 148 which is slideably supported on the frame member. As will be seen in FIGS. 17 and 18, the bracket 148 is provided with a pair of elongated slots 149 which cooperate with pins mounted in the frame member for slideably securing and limiting the movement of the bracket 148 longitudinally of the slots. The bracket 148 has an upright leg 151, the end of which is provided with a cam follower adapted to engage a third cam portion 136c on the opposite surface of cam 136. A spring 152 connected to a lug on the bracket 148 and to a lug on the frame member serves to bias the bracket in a position so that the cam follower is maintained in contact with the cam.

Referring to FIGS. 17 and 18 it will be seen that each of the slide guides 56 and 57 is provided with an angular lead-in so as to facilitate entrance of the slide into the guides, each of which has a longitudinal V-shaped groove with the grooves being in a vertical planar registration so as to align the slide in a plane at a right angle to the optical axis of the lens system. The movement of the movable slide guide 56 as controlled by the cam portion is synchronized with the movement of the slide lifter 141 so that when the lifter is in its uppermost position, as illustrated in FIG. 18, the movable slide guide 56 is at its most remote position in relation to the fixed slide guide 57 so that there is adequate clearance for the easy movement of the slide between the guides. Actually the clearance is sufficient to permit the slide to fall by gravity to a point where it will rest on the ledges 153 at the lower ends of the guides. Substantially at the point where the lifter 141 assumes its lowermost position, as illustrated in FIG. 17, the movable slide guide 56 is cause to move to the right, so that the side edges of the slide are received in the respective bottoms of the V-grooves of the guides, the slide being so held by the tension of spring 152. Thus, the slide is accurately located in a vertical plane at right angles to the optical axis of the lens system with the center of the slide being in registration with the optical axis. Correspondingly, at that point the shutter blades 113 will have been caused to open to the position illustrated in FIG. 14 so as to be clear of the gate and permit projection of the slide.

Referring to FIGS. 13, 14, 17 and 18, the bracket 148 is provided with an integral lug 154 which extends laterally through an elongated slot in the frame member. The lug 154 extends for a sufficient distance so as to be disposed in the path of movement of the end of the lever 116 and, under certain conditions, as will be presently explained, will prevent movement of said lever and thereby prevent acuation of the shutter blades. It will be seen that when no slide is disposed between the slide guides 56 and 57 the movable guide 56 is drawn by the spring 152 to its extreme right position, as viewed in FIG. 17, at which point the lug 154 of the bracket 148 is disposed directly in the path of travel of the end of the lever 116, as shown by the broken lines in FIG. 13, thereby preventing the lever 116 from rocking clockwise from the position illustrated in FIG. 13 to that illustrated in FIG. 14. Thus, since the lever 116 cannot move even though the cam 91 is being caused to rotate, the shutter blades 113 remain closed thereby blocking the gate 124 and preventing any light from the lamp passing through. Accordingly, when the projector is being operated, if no slides are presented for projection, the gate is blocked so that the beam of light from the lamp is not projected on to the screen. However, in the course of operation of the projector, when a slide is caused to drop between the guides, the movable guide 56 is prevented from moving to its extreme right position, as viewed in FIG. 17, and as a result the lug 154 is disposed in a position out of the path of movement of the end of the lever 116 so that the lever is actuated by its respective cam and effects operation of the shutter blades, as hereinabove explained.

Indexing mechanism

Figure 8:
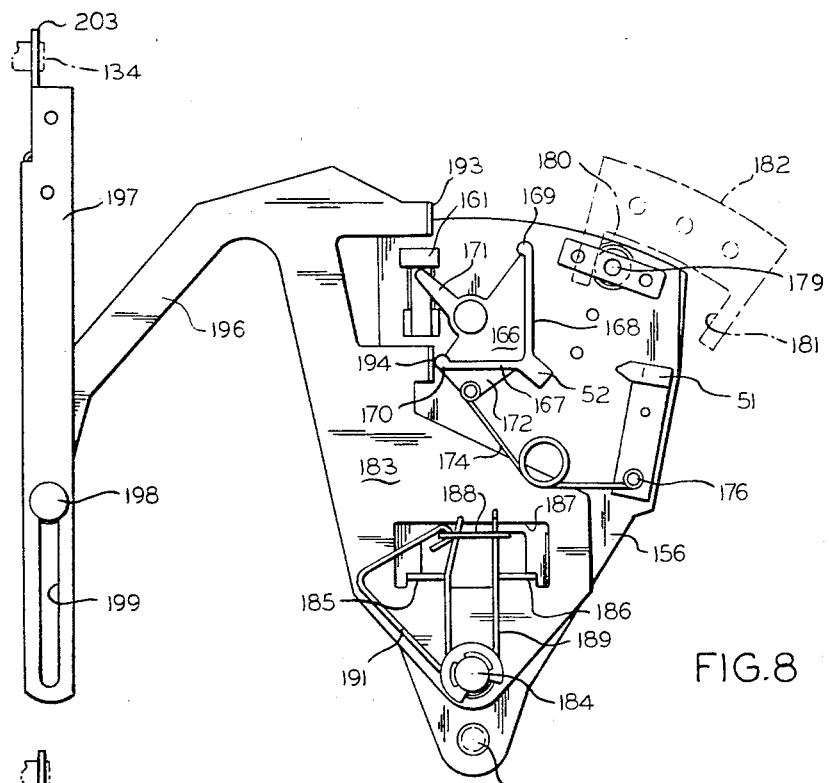
FIG. 8 is a top plan view, on an enlarged scale, of a sub-assembly, illustrating the tray indexing mechanism, with the parts disposed in at-rest locked position.
Figure 9:
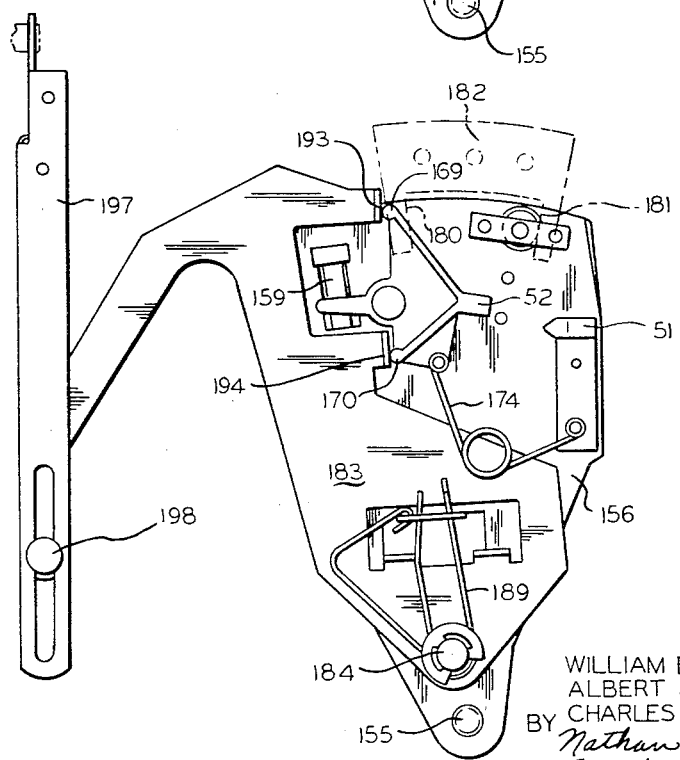
FIG. 9 is a similar view showing the relationship of the parts at the end of an indexing movement.
Figure 10:
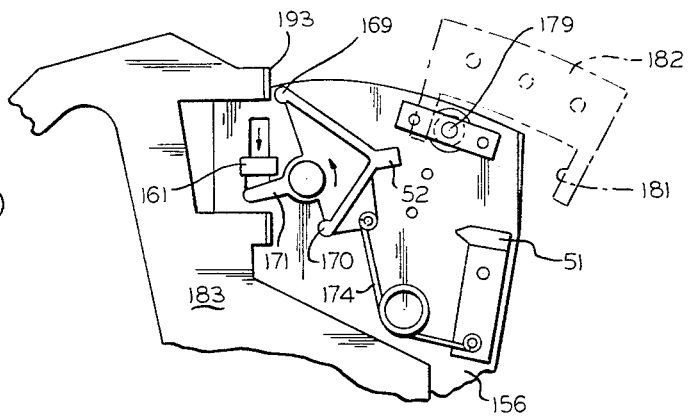
FIG. 10 is a fragmentary view, similar to FIG. 8, showing the parts arranged for reverse movement of the tray.
Figure 11:
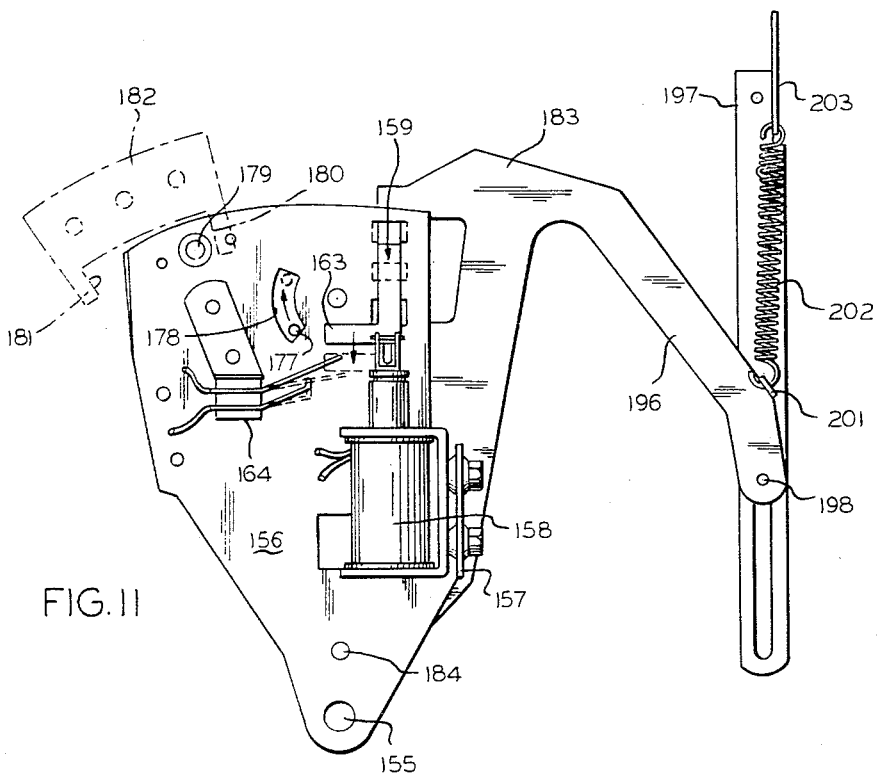
FIG. 11 is a bottom plan view of the sub-assembly illustrated in FIG. 8.

Referring to FIGS. 3–11, the indexing mechanism comprises a generally triangular plate 156 (FIG. 11) having an upturned lug 157 to which is secured a solenoid 158. Connected to the plunger of the solenoid 158 is a slide member 159 reciprocably slideable in the direction of movement of the plunger. The slide member 159 includes a portion 161 which passes through a slot in the plate 156 and has lateral projections which overhang the marginal edges of the slot 162 on the opposite side of the plate to retain the slideable member in assembled relation with the plate. Referring to FIG. 11, the slideable member 159 has a laterally extending arm 163 which is adapted to engage one blade of the switch 164 mounted on the plate to actuate the same. The plate 156 is pivotally secured to a boss, not shown, as at 155, on the underside of the top wall 22. Pivotally secured to the plate 156 is a plastic pawl member 166 which is shaped substantially like that illustrated in FIGS. 8 to 10. The pawl member includes a pawl 52 integral with and projecting from a generally triangular body portion. Ribs 167 and 168 extend from the pawl 52 to the opposite terminal portions 169 and 170 of the body portion, said terminal portions being rounded, as illustrated. The body portion also includes an integral arm 171 extending in a direction opposite from that of the pawl 52 and having a depending lug at the end which is adapted to be engaged by the portion 161 of the slide member. The body portion includes a lateral extension 172 having an upstanding stud 173 to which is hooked one end of a torsion spring 174, the other end being hooked to a pin 176 mounted on the plate. An integral lug 177 depending from the underside of the body portion of the pawl member 166 projects through a slot 178 in the plate (FIG. 11) and serves to limit the pivotal movement of the pawl member 166 in both directions of rotation. Referring to FIG. 11, the dotted line position of the lug 177 corresponds to the position of the pawl member, as illustrated in FIG. 10, which represents the limit of counterclockwise moment of the pawl member. Correspondingly the solid line position of the lug 177, as seen in FIG. 11, corresponds to the position of the pawl member as illustrated in FIG. 8 and this represents the limit of clockwise movement of the pawl member.

A key 51 formed of plastic or the like is fixedly mounted on the plate 156 in spaced relation to the pawl member 166 and has a depth substantially equal to that of the pawl 52 and a width such as to fit snugly in the space between adjacent pins 66 of the tray. The key 51 affords a stop for accurately locating a tray, in its indexing movement, in registration with the slide guides. A pin 179 depending from the underside of the plate 156 is preferably enclosed in a resilient sleeve, and serves as a stop to limit the movement of the plate between the shoulders 180 and 181 of a bracket 182 supported on the frame, as seen clearly in FIGS. 10 and 11.

A pawl actuating member 183, shaped substantially like that illustrated in FIGS. 8 and 9, is pivoted to the plate 156 as at 184 and includes a pair of spaced upturned lugs 185 and 186 and a generally rectangular aperture 187 through which projects an ear 188 integral with the plate 156. Said ear is provided with an elongated slot, not shown, through which pass the legs of a torsion spring 189 carried on the pivot pin 184. The spring 189 normally biases the member 183 in a direction away from the plate 156, as illustrated in FIG. 8. It will be seen that the relative positions of the plate and member 183 when at rest are determined by the engagement of the lugs 185 and 186 against the legs of the spring 189. A booster spring 191 also carried on the pin 184 complements the spring tension afforded by the spring 184 when the plate and member 183 are moved beyond the normal position, as will be hereinafter explained. The member 183 includes a cut-out 192 at the ends of which are a pair of spaced up-turned lugs 193 and 194 adapted to engage the ends 169 and 170 respectively, of the pawl member, as will be hereinafter explained. The member 183 includes an integral angular arm 196 which is connected at its end to an actuating link 197 by means of a headed pin 198 passing through an elongated slot 199 in said link.

Referring to FIG. 11 the arm 196 on its underside includes a lug 201 to which is connected one end of a coil spring 202 the other end of said spring being connected to a terminal portion 203 of the link bent at right angles to the plane of the link. As will be apparent the spring 202 biases the link in relation to the arm 196 so that the pin 198 engages one end of the slot 199, substantially as illustrated in FIG. 8. The terminal portion 203 is further provided with an aperture to receive the pin 134 on the end of the arm 133 thereby to effect operative connection between said arm and the link 197.

Figure 19:
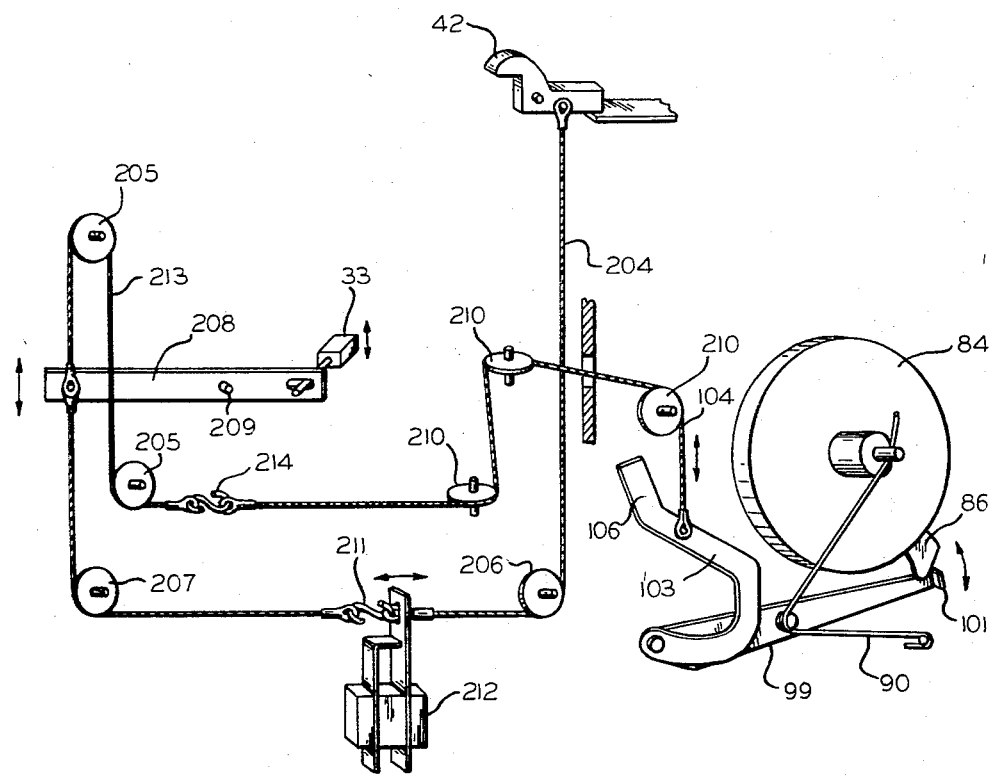
FIG. 19 is a more-or-less diagrammatic view illustrating the latch control means for the slide tray.

FIG. 19 illustrates the means for controlling the actuation of the tray latch 42. Said means includes a cord 204 which is attached to the latch, said cord passing over a pair of guide pulleys 206 and 207 and being connected to one end of a lever 208 which is pivoted as at 209. The other end of the lever 208 is connected to actuating button 33 which is adapted to be moved in the direction of the arrows to rock the lever about its pivotal axis. The cord may be formed in two sections with adjacent ends being provided with loops and connected by an S-shaped hook 211. One of the loops passes through an opening in the blade of an electrical switch 212, the blade being so confined that movement of the cord 204 will effect actuation of the blade of switch 212 to open and close an electrical circuit, as will be hereinafter explained. A third section of cord 213 is connected to the lever 208 and passes over guide pulleys 205 and is connected to cord section 104 by an S-hook 214, the cord passing over guide pulleys 210 and being connected to the link 103. It will be apparent that upon actuation of the button 33 in a downwardly direction, the right hand end of the lever 208 will swing upwardly causing the cord 204 to draw the latch 42 downwardly to non-operative or retracted position, and simultaneously moving the blade of switch 212 to the left in order to effect a closing of the electrical circuit. Correspondingly, the lever 99 because of the release of tension on the link 103 is urged by the spring 102 into a position to engage the pawl extension 96 and thereby deactivate the driven clutch member 84, as will be hereinafter explained. When the lever 208 is moved in an opposite direction so that the right-hand portion of the lever moves downwardly, the blades of switch 212 are caused to separate and the latch 42 is caused to move by its spring, not shown, to operative position to lock the slide tray on the projector. Also, tension is applied to the link 103 causing the lever 99 to swing in a clockwise direction so that its lug 101 is out of the path of movement of the pawl extension 86 so as not to interfere with the clutch operation.

*Operation*

To initiate operation of the projector, the switch button 32 is moved to a first position which effects operation of the motor only while the uppermost position will also effect a closing of the circuit to the projector lamp. In order to place the slide tray on the projector, the switch button 33 is moved to its lower position which, as will be seen in FIG. 19, effects retraction of the tray latch 42 within the spindle 39 and also effects closing of the switch 212 which controls the solenoid 98 causing the lever 94 to assume the position illustrated in FIG. 16 so that the driven clutch member 84 is permitted to rotate substantially one-half of a revolution to the point where the lug 101 which is disposed in the position illustrated in FIG. 15 engages the pawl extension 86 and rocks the pawl to de-activate the driven clutch member 84. At this point substantially one-half of a cycle of revolution of the cams 91 and 136 has been completed and the key 51 is rested in an intermediate position, substantially like that illustrated by the broken lines in FIG. 3. In such position, the key is disposed away from the path of movement of the depending pins 66 of the tray and the tray may be readily positioned on the spindle 39 with the base apertures in registration with the pins 46 and 47. The tray may then be locked to the projector by manipulating the switch button 33 in an upwardly direction which effects extension of the latch 42 into overlapping engagement with the marginal edge of the central opening of the tray base. In such movement the blades of the switch 212 are separated effecting de-energization of the solenoid 98 so that the spring 97 rocks the lever 94 to the position illustrated in FIG. 15. Correspondingly, the link 103 is drawn by the cord 104 to cause the lever 99 to assume the position illustrated in FIG. 16, out of the path of movement of the pawl extension 86.

Figure 3:
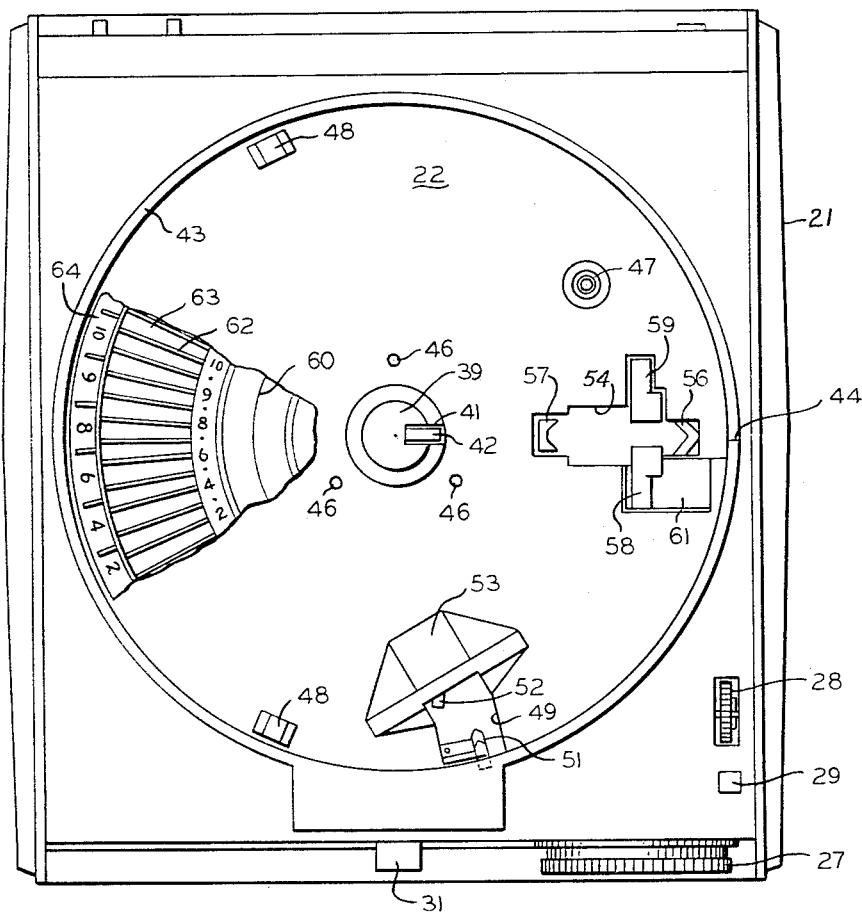
FIG. 3 is a top plan view of the projector of FIG. 1 with a major portion of the slide tray broken away to more clearly illustrate structural features.

It will also be understood that the tray may be placed on the projector even while the key 51 is in operative position, as illustrated in FIG. 3, and while the tray latch 42 is in extended position. Both the key and the latch are spring biased and will yield upon engagement with the cooperating parts of the tray.

Figures 4, 5, 6:
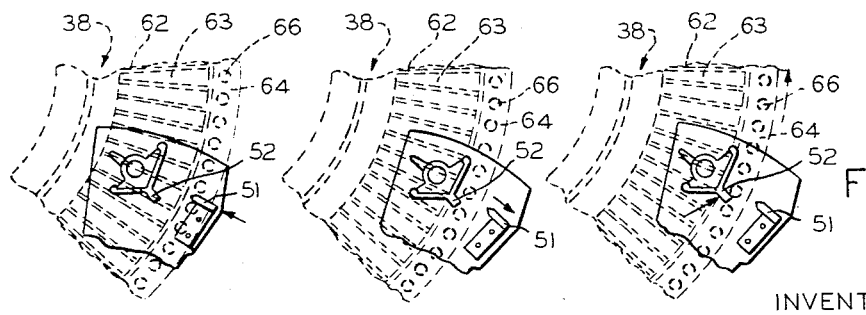
FIG. 4 is a fragmentary top plan view illustrating the tray advancing pawl and locking means in at-rest position.
FIGS. 5 and 6 are similar views showing the pawl and locking means in intermediate tray advancing positions.

The projector is now ready for operation and upon the operator actuating the switch button 37 in a downward direction, counterclockwise or forward movement of the tray will be effected, as will be presently explained. Actuation of switch 37 effects energization of the solenoid 98 to move the lever 94 to the position illustrated in FIG. 16, out of engagement with the pawl extension 86 so as to permit transmission of power from the driving to the driven clutch member. It will be understood that energization of the solenoid 98 is momentary and, accordingly, the lever 94 is immediately thereafter moved back into stopping position, as illustrated in FIG. 15. The driven clutch member 84 may make only one complete revolution before it is again arrested and the clutch is de-activated. The cams 91 and 136 will, of course, complete one revolution and in such movement the three-armed lever 133 will be caused to move from the position illustrated in FIG. 14 to that illustrated in FIG. 13 and will return to its initial position. The link 197 which is pivotally connected to the arm 133 will rock the complete assembly about the pivot point 155 in a clockwise direction, as viewed in FIG. 8, so that the key 51 is positioned out of the path of movement of the tray pins 66. The tray thus, is released for movement to the next indexed position. When the pin 179 on the plate 156 abuts the stop-shoulder 181, movement of the plate is arrested and continued movement of the link 197 will effect pivotal movement, in a clockwise direction, of the member 183 relative to the plate 156 so that the lug 194 will engage end 170 of the pawl member 166 to rock the same in a counter-clockwise direction, from the position illustrated in FIG. 8 to that illustrated in FIG. 9. Referring to FIGS. 4, 5 and 6, the movement of the pawl 52 and key 51 in relation to the tray pins 66 may be readily seen. FIG. 4 represents the at-rest position in which the key 51 is disposed between two adjacent pins 66, thereby locking the tray against movement, and the pawl 52 is in retracted position, substantially like that illustrated in FIG. 8. In the next stages of operation, as illustrated in FIGS. 5 and 6, the key 51 is caused to move away from the path of travel of the pins 66 to permit movement of the tray and the pawl 52 is rocked into a position to engage one of the pins 66 of the tray. Upon the completion of movement of the pawl 52, to the position illustrated in FIG. 9, the tray is advanced one full index position to align the next succeeding compartment 63 containing a slide with the slide guides 56 and 57. It will be seen that because the pivotal movement of the plate 156 is stopped when the parts are in the relationship illustrated in FIG. 9, some over travel between the link 197 and the arm 196 will occur. As the cam 111 completes its cycle of revolution, the member 183 is rocked by the spring 189 in a counter-clockwise direction so as to permit the pawl member 166 to rock in a clockwise direction to return to non-operating position. Thereafter, the link 197 rocks the complete assembly in a counter-clockwise direction as viewed in FIG. 8 so as to return the assembly to non-operating position wherein the key 51 is disposed between adjacent pins 66 as illustrated in FIG. 4, to lock the tray.

When it is desired to effect a reversal of the rotation of the slide tray, movement of the actuating button 37 upwardly effects energization of the solenoid 158 so that the slide member 159 is caused to move in the direction indicated by the arrow in FIG. 10, whereby the shoulder 161 engages the arm 171 of the pawl member 166 and rocks the same in a counter-clockwise direction. The spring 174 in such position is over center and maintains the pawl member in the position illustrated in FIG. 10.

Referring to FIG. 11, it will be seen that when the slide member 159 is in the operative position, as illustrated by the broken lines, the blades of switch 164 are moved into contact to close an electrical circuit to effect energization of the solenoid 98 whereby the clutch is again activated to drive the cam 111 to rock the plate 156 and its associated components in the same manner, as hereinbefore described. Referring to FIG. 10, it will be noted, that in this instance the lug 193 is caused to engage the end portion 169 of the pawl member to rock the same in a clockwise direction, whereby the pawl 52 will engage a pin 66 of the tray and will index the same in a reverse or clockwise direction to the next operative position. It will be noted that as the pawl member 166 is caused to move from the position illustrated in FIG. 10 it assumes an intermediate position corresponding to that illustrated in FIG. 9, and the spring 174 thereafter will rock the pawl member to its normal non-operative position corresponding to that illustrated in FIG. 8, which represents the normal position assumed by the pawl member for indexing the tray in a forward direction. Accordingly, after each reverse operation the mechanism is automatically conditioned for forward operation without the necessity for manipulating any controls to again effect operation in a forward direction.

Referring to FIGS. 14 and 17, it will be seen that when the three-armed lever 133 is substantially in the position illustrated in FIG. 14, the slide lifter 141 is disposed at its lowermost position corresponding to its at-rest position. As the respective cams are simultaneously rotated, the indexing mechanism is caused to be actuated, in the manner hereinabove described, and in synchronism therewith, the slide lifter 141 is caused to move upwardly to assume the position illustrated in FIGS. 13 and 18, just prior to the instant in which an indexing movement of the tray is effected so that the slide lifter 141 is in position to support a slide. In such position the surfaces of the nylon inserts 58 and 59 are substantially in the same plane as the upper surface of the slide lifter, so that as the slides S are caused to move sequentially into position to register with the slide guides 56 and 57 they are caused to be elevated slightly above the plane of the top wall 22 and are easily carried over from the inserts 58 and 59 to the slide lifter. It will also be noted that when the slide lifter 141 is in its uppermost position, the bracket 148 carrying the movable slide guide 56 has been moved to its extreme left position, as viewed in FIG. 18, so that the space between the movable and fixed slide guides is greater than the width of a slide and the slide may freely pass between the guides in its downward movement supported on the slide lifter. When the slide lifter reaches its lowermost position, as illustrated in FIG. 17, the bracket 148 is drawn by the spring 152 to the right so that the slide is disposed snugly between the guides and is held securely in the optical axis of the lens system, the side edges of the slide being received in the V grooves of the slide guides. During the downward movement of the slide to its position in registration with the optical axis, the shutter blades 113 remain closed. However, when the slide lifter 141 reaches its lowermost position, the cam follower on the lever 116 is in engagement with a low point on its operating cam and the spring 123 draws the lever 116 downwardly and effects rapid opening of the shutter blades.

When the control button 37 is again actuated to index the next slide into projection position, the driven clutch member 84 is activated and the moveable guide 56 is maintained in slide holding position during the interval in which it is carried upwardly by the slide lifter 141 and inserted into the registerng compartment 63 in the tray. The slide lifter remains in its upper position for an interval during which the next succeeding slide is moved into registration with the slide guides 56 and 57 while the slide just projected is moved into the tray support. The slide lifter then is caused to move downwardly to its lower position with the various components operating as hereinbefore described.

In the event that the operator desires to project a specific slide out of sequence, the tray release button 33 is moved to its lower position so as to retract the latch 42 and effect actuation of the cams for movement substantially through one-half cycle whereby to position the key 51 in the intermediate position, illustrated by the broken lines in FIG. 3, as hereinbefore described. In this position the key 51 is clear of the pins 66 of the tray and the tray may be rotated in either direction so as to effect registration of such slide with the slide guides. Thereafter, the button 33 is moved to its upper position and, as was hereinabove explained, such movement will permit the driven clutch member 84 to complete its cycle of rotation during which the slide is caused to be positioned in registration with the optical axis of the lens system. The projector thereafter, may be operated by manipulating the control button 37 to index the tray to present the slides in sequence or, if it is merely desired to return the slide to its respective compartment, the button 33 is moved downwardly so as to effect operation of the mechanism for only one-half cycle to cause the slide lifter 141 to elevate the slide and return the same to its compartment 63.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. A projector for projecting slides disposed in a slide tray having a portion adapted to be fixed on the projector and having a relatively movable portion, the fixed portion having a slot through which the slides are adapted to pass substantially vertically, one at a time, said projector including:
   (a) a pair of spaced slide guides,
   (b) one of said guides being movable relative to the other to secure a slide therebetween,
   (c) said slot adapted to be disposed in registration with said guides,
   (d) indexing means for moving said movable tray portion for successively aligning slides in the slide tray, one at a time, in substantially vertical registration with said slot,
   (e) slide carrying means operating in timed relation with said indexing means for successively feeding each slide between said slide guides and returning each said slide through said slot into said slide tray,
   (f) drive means for operating said indexing means and slide carrying means, and
   (g) means for yieldably operatively engaging said slide carrying means with said drive means so as to permit disengagement therebetween in the event said slide carrying means in its upward slide returning movement meets with resistance to such movement thereby to prevent injury to a slide upon any jamming thereof in the course of its upward movement from the projector to the slide tray.

2. The invention as defined in claim 1 including stationary means for elevating the slide just prior to its movement into registration with said slot.

3. The invention as defined in claim 1 including latching means for securing said tray to said projector, and means for operating said latching means to permit removal of said tray at any stage in the operation of said projector.

4. The invention as defined in claim 1 including means for selectively conditioning said drive means to effect operation of the projector for a complete cycle and a partial cycle of operation.

5. The invention as defined in claim 1 wherein the indexing means includes a pivoted plate member, a pawl member pivotally supported on said plate member, an actuating member pivotally secured to said plate member and having means for effecting rocking of said pawl member in a direction to effect indexing movement of said tray.

6. The invention as defined in claim 5 including means for selectively changing the direction of movement of said pawl member to reverse the direction of movement of said slide tray.

7. The invention as defined in claim 6 wherein the last-mentioned means includes a solenoid operatively connected to said pawl member.

8. The invention as defined in claim 1, in which the slide carrying means comprises a lever having slide-engaging means at one end and a cam follower at the other end, a cam operatively engaged by said follower, said lever being pivotally supported intermediate its ends, and a spring normally biasing said lever in a direction to engage said cam follower with said cam.

9. The invention as defined in claim 1 wherein the indexing means includes a pivoted plate member, a key fixed on said plate member, said key being normally in engagement with said tray to lock the same against movement, a pawl member pivotally supported on said plate member in spaced opposed relation to said key, an actuating member pivotally secured to said plate member and cooperating with said plate member and said pawl member to move said key away from engagement with said tray and to rock said pawl member in a direction to effect indexing movement of said slide tray.

10. The invention as defined in claim 1 including means operating in timed relation to said indexing means for moving said movable slide guide away from said fixed slide guide so as to permit a slide to pass freely therebetween.

11. The invention as defined in claim 4 including latching means for securing said tray to said projector and control means connected to said latching means and to said drive means and operable when said latching means is effective to condition said drive means for full cyclic operation and when said latching means is ineffective to condition said drive means for partial cyclic operation.

12. The invention as defined in claim 1 including a shutter and means for operating said shutter, said means being coordinated with said movable slide guide whereby movement of said slide guide will control the movement of said shutter.

13. The invention as defined in claim 1 including a shutter and means for operating said shutter, said means being coordinated with said movable slide guide whereby the absence of a slide between said guides will prevent operation of said means to open said shutter.

14. In a projector for projecting slides,
 (a) a pair of spaced slide guides,
 (b) one of said guides being movable relative to the other to secure a slide therebetween,
 (c) a shutter and
 (d) means for operating said shutter,
 (e) said means being coordinated with said movable slide guide whereby movement of said slide guide will control the movement of said shutter.

References Cited
UNITED STATES PATENTS 2,878,604    3/1959    Mulch _____ 40—79
2,276,314   10/1966    Robinson _____ 88—27

NORTON ANSHER, *Primary Examiner.*

R. P. GREINER, *Assistant Examiner.*